United States Patent [19]
Anatychuk et al.

[11] 3,920,480
[45] Nov. 18, 1975

[54] MONOCRYSTALLINE ANISOTROPIC THERMOELEMENT HAVING SHORTED EMF VECTOR IN THE DIRECTION COINCIDENT WITH THAT OF THE THERMAL FLUX

[76] Inventors: Lukyan Ivanovich Anatychuk, Proezd Fizkulturny, 4, kv. 21; Valentin Trofimovich Dimitraschuk, Proezd Fizkulturny, 17, kv. 100; Oleg Yanovich Luste, ulitsa Lomonosova, 6, kv. 4, all of Chernovtsy, U.S.S.R.

[22] Filed: Dec. 4, 1973

[21] Appl. No.: 421,633

Related U.S. Application Data
[63] Continuation-in-part of Ser. No. 235,520, March 17, 1972, abandoned.

[52] U.S. Cl. ............... 136/205; 136/213; 136/236
[51] Int. Cl.² ............................................. H01V 1/02
[58] Field of Search ............ 136/205, 213, 236, 238

[56] References Cited
UNITED STATES PATENTS

| | | | |
|---|---|---|---|
| 3,442,718 | 5/1969 | Dingwall et al. | 136/239 X |
| 3,530,008 | 9/1970 | Samoilovich et al. | 136/236 X |
| 3,785,875 | 1/1974 | Pilat et al. | 136/205 |

*Primary Examiner*—Benjamin R. Padgett
*Assistant Examiner*—E. A. Miller
*Attorney, Agent, or Firm*—Waters, Schwartz & Nissen

[57] ABSTRACT

A thermoelement comprising a monocrystal possessing different electric conduction coefficients along at least two principal crystallographic axes, wherein a thermoelectromotive force appears under the effect of the thermal flux therethrough, and at least one shorting member electrically connecting at least two points on said monocrystal, which lie opposite to each other on the outer surface thereof and in the plane passing through said two principal crystallographic axes, so that the straight line interconnecting these points forms an angle other than 0° and 90° with one of said principal crystallographic axes. Said member is designed to short the thermoelectromotive force component the direction whereof coincides with that of said thermal flux. The thermoelement also comprises leads to tap current from the monocrystal in a direction normal to said straight line interconnecting said two points on the monocrystal and in the plane passing through said two principal crystallographic axes.

7 Claims, 5 Drawing Figures

MONOCRYSTALLINE ANISOTROPIC THERMOELEMENT HAVING SHORTED EMF VECTOR IN THE DIRECTION COINCIDENT WITH THAT OF THE THERMAL FLUX

The present application is a continuation-in-part of our copending application Ser. No. 235,520 filed on Mar. 17, 1972 and now abandoned.

The present invention relates to thermal-to-electric energy converters, and more particularly to thermoelements used, for example, as a thermoelectric power source, a temperature-difference transmitter, a thermal-flux sensor, or a thermal radiant-energy detector.

Thermoelements are known that comprise a cadmium antimonide monocrystal, utilizing the anisotropy of a physical property of the monocrystal, namely the thermoelectromotive force anisotropy.

These thermoelements are used in such a manner that the thermal flux through the monocrystal forms an angle with one of the principal crystallographic axes. Said thermoelements produce a thermoelectromotive force directed transversely with respect to the thermal flux. This thermoelectromotive force is proportional to the difference $(\alpha_1 - \alpha_2)$, where $\alpha_1$ and $\alpha_2$ are the thermoelectromotive force coefficients along the two principal crystallographic axes. The thermoelectromotive force anisotropy of which use is made in said thermoelements is a rather rare phenomenon occurring only in a limited number of crystals. The highest value of $(\alpha_1 - \alpha_2)$ known at present for crystals does not exceed 300 $\mu V/°C$, which accounts for low voltages produced by such thermoelements, as well as their poor efficiency.

Therefore, it is an object of the present invention to provide a thermoelement which will make it possible to substantially extend the group of monocrystalline materials used in the manufacture of thermoelements.

Another object of the invention is to provide a thermoelement with a substantially higher thermoelectric conversion efficiency.

Still another object of the invention is to provide a thermoelement capable of developing a higher output voltage.

These objects are attained by that a thermoelement comprises, according to the invention, a monocrystal possessing different electric conduction coefficients along at least two principal crystallographic axes, wherein a thermoelectromotive force is developed under the effect of the thermal flux therethrough, at least one shorting member electrically connecting at least two points on the monocrystal, which lie opposite to each other on the outer surface of the monocrystal and in the plane passing through said two principal crystallographic axes, so that the straight line interconnecting these points forms an angle other than 0° or 90° with one of said crystallographic axes, said shorting member being designed to short the thermoelectromotive force component the direction whereof coincides with that of said thermal flux, and leads to tap current from the monocrystal in a direction normal to said straight line interconnecting said two points on the monocrystal and the plane passing through said two principal crystallographic axes.

To simplify the design of the thermoelement, it is expedient that the shorting member be made in the form of a metal conductor electrically coupled to said monocrystal only at said two points.

To provide for a higher output voltage, it is preferable that the thermoelement comprise a plurality of such shorting members.

To simplify the design of the thermoelement and ensure better operating conditions thereof, it is advisable that the monocrystal be shaped as a rectangular bar with one of its faces being parallel to said plane passing through the two principal crystallographic axis.

To facilitate the manufacture of the thermoelement, it is desirable that the shorting member be made as a monocrystalline plate from a material the thermoelectromotive coefficient whereof is different from that of the monocrystal and the electric conduction coefficients whereof are different in at least two mutually perpendicular directions, the direction with the higher electric conduction coefficient coinciding with said line interconnecting said two points on the monocrystal.

To facilitate the manufacture of the thermoelement, it is also desirable that the monocrystalline plate be in electric contact with the entire surface of said face of the monocrystal.

The above features of the proposed thermoelement permit a five-to ten-fold increase in the thermoelectric conversion coefficient.

The invention will now be described in greater detail with reference to preferred embodiments thereof taken in conjunction with the accompanying drawings, wherein.

Figure 1:
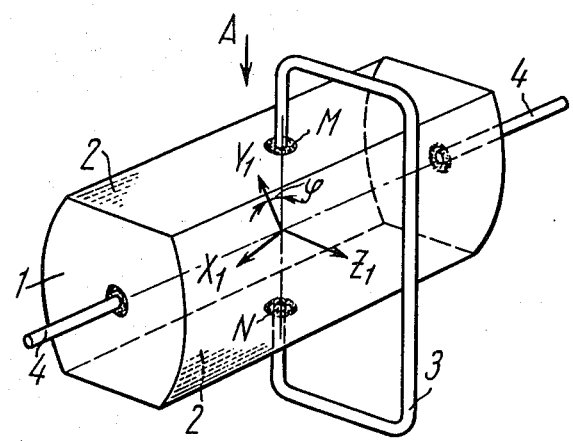
FIG. 1 is a general view of the proposed thermoelement showing the orientation of the principal crystallographic axes of the monocrystal.

Referring now to FIG. 1, the proposed thermoelement comprises, according to the invention, a monocrystal 1 possessing different electric conduction coefficients $\sigma_x$ and $\sigma_y$ along two principal crystallographic axes $X_1$ and $Y_1$, respectively. The electric conduction coefficient along the third principal crystallographic axis $Z_1$, normal to axes $X_1$ and $Y_1$, is equal to one of the coefficients $\sigma_x$ and $\sigma_y$, though it may also be different from both said coefficients.

Used as the material for the monocrystal 1, possessing different coefficients $\sigma_x$ and $\sigma_y$, is monocrystalline bismuth telluride. However, use may also be made of monocrystalline cadmium antimonide doped with acceptor impurities.

The monocrystal 1 has the shape of a cylinder the longitudinal axis whereof is normal to axis $Z_1$. The lateral surface of the cylinder is provided with mutually parallel flat faces 2. These faces 2 are also parallel both to the longitudinal axis of the cylinder and to axis $Z_1$. In operation, the thermal flux traverses the thermoelement from one face 2 to the other in a direction indicated by arrow A.

The thermoelement also comprises a shorting member 3 which electrically connects two points M and N on the monocrystal 1, so located on the outer surface thereof that straight line MN interconnecting these points lies in the plane passing through axes $X_1$ and $Y_1$ and forms an angle $\phi$, other than 0° and 90°, with one of the principal crystallographic axes ($Y_1$); in this particular case, $\phi = 45°$. The shorting member 3 is made in the form of a metal (copper) conductor. The electric connection of the shorting member 3 to the monocrystal 1 is ensured by soldering (or welding) them together.

In the embodiment shown in FIG. 1, the points of connection of the shorting member 3 to the monocrystal 1, i.e., points M and N, are located on the flat faces 2 of the monocrystal 1.

The thermoelement further comprises leads 4 for tapping current from the monocrystal 1 in a direction normal to straight line MN interconnecting points M and N, and in the plane passing through axes $X_1$ and $Y_1$. The leads 4 are arranged opposite to each other, on the end faces of the cylinder, so that the straight line therebetween is normal to said straight line MN.

Figure 2:
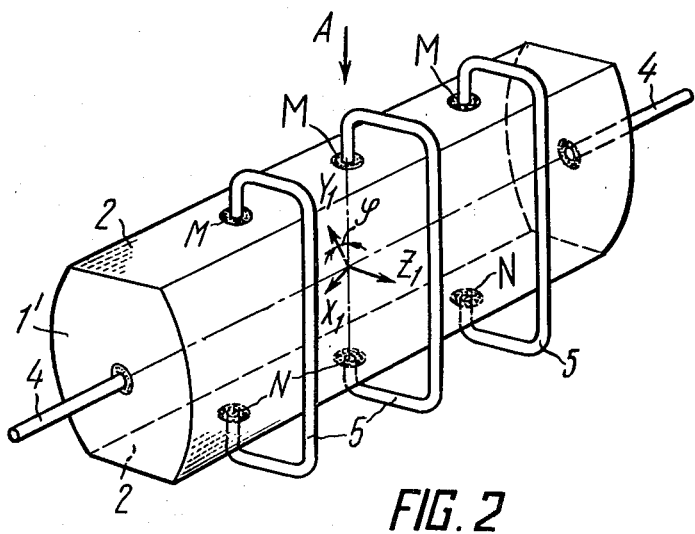
FIG. 2 is a general view of another embodiment of the proposed thermoelement showing the orientation of the principal crystallographic axes of the monocrystal.

In the second embodiment shown in FIG. 2, the thermoelement is made similar to that of FIG. 1 with the difference that it now comprises a plurality (three) shorting members 5 which are identical, in their function and arrangement, to the shorting member 3, and which electrically interconnect three pairs of points M and N on the monocrystal $1^1$.

Figure 3:
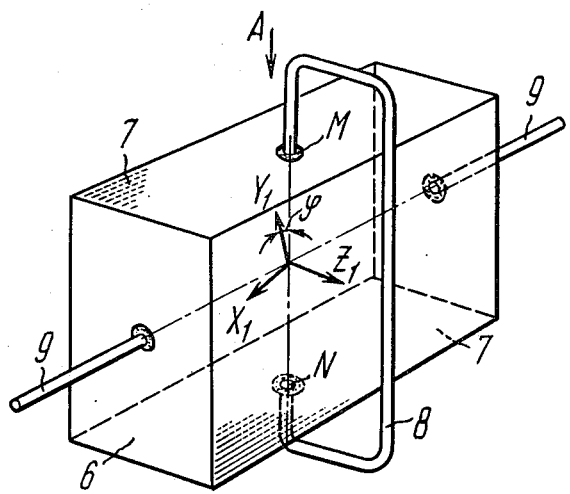
FIG. 3 is a general view of a third embodiment of the proposed thermoelement showing the orientation of the principal crystallographic axes of the monocrystal.

In the third embodiment of FIG. 3, the thermoelement only differs from that of FIG. 1 in that its monocrystal 6, possessing the same electric properties and crystallographic orientation, is made in the form of a rectangular bar with one of its faces being parallel to the plane passing through axes $X_1$ and $Y_1$.

As in the first embodiment shown in FIG. 1, the monocrystal 6 has two flat faces 7 parallel to axis $Z_1$, with points M and N being arranged opposite to each other on these faces and electrically interconnected via a shorting member 8. The crystallographic orientation of straight line MN between points M and N is similar to that in the embodiment of FIG. 1. Thus, the shorting element 8 in this particular embodiment is identical, in function and arrangement, to the shorting member 3 in the first embodiment (FIG. 1).

Leads 9 perform the same function as the leads 4 of FIG. 1, angle $\phi$ is also equal to 45°, and the thermal flux also traverses the thermoelement from one of the faces 7 to the other in a direction indicated by arrow A.

Figure 4:
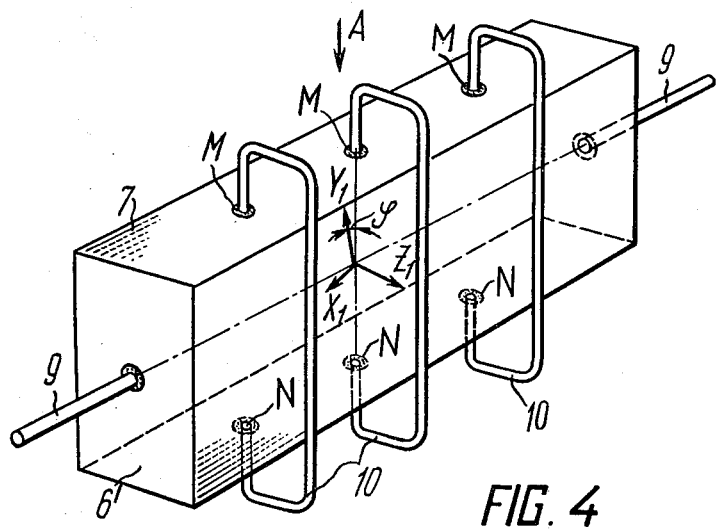
FIG. 4 is a general view of a fourth embodiment of the proposed thermoelement showing the crystallographic orientation of the monocrystal.

The fourth embodiment of the proposed thermoelement, shown in FIG. 4, differs from that of FIG. 3 only in that it has a plurality (three) of shorting members 10 identical to the shorting member 8 and electrically interconnecting three pairs of points M and N on the monocrystal $6^1$.

Figure 5:
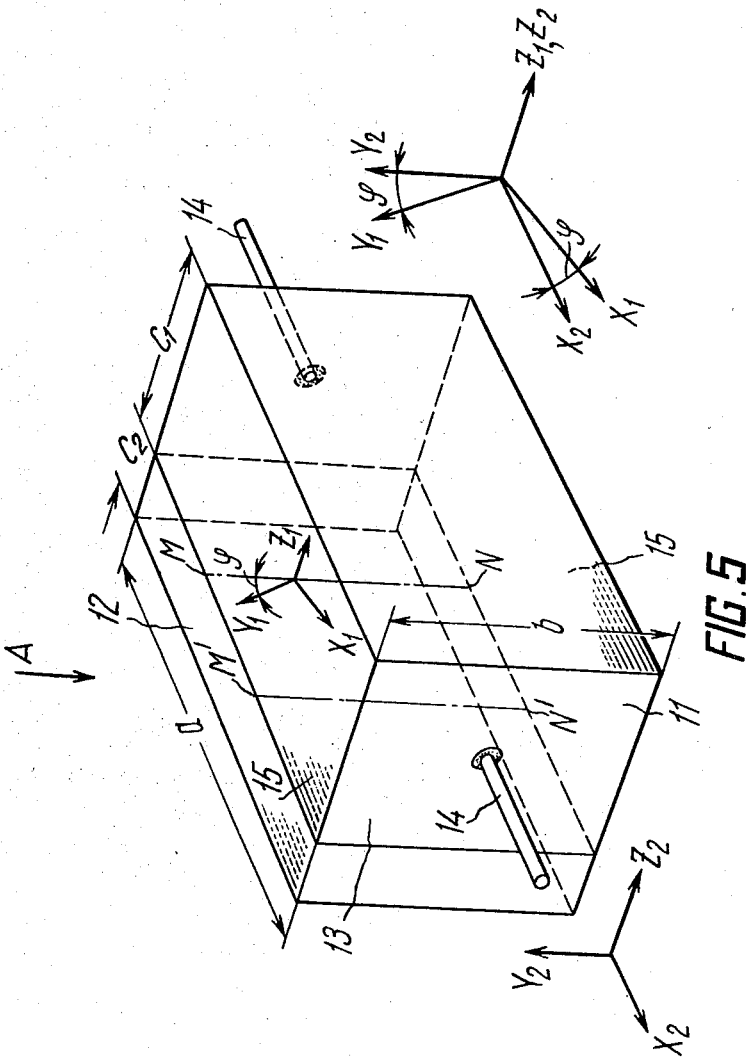
FIG. 5 is a general view of a fifth embodiment of the proposed thermoelement showing the mutual orientation of the principal crystallographic axes of the monocrystal and monocrystalline plate.

In the fifth embodiment shown in FIG. 5, the thermoelement comprises, as also does that of FIGS. 3 and 4, a monocrystal 11 in the form of a rectangular bar having the same properties and crystallographic orientation as the monocrystal 6 ($6^1$). The embodiment differs from those shown in FIGS. 3 and 4 in that the shorting member 12 is made as a monocrystalline plate from a material whose thermoelectromotive force coefficient is different from that of the material from which the monocrystal 11 is made and which possesses different electric conduction coefficients along two mutually perpendicular axes $X_2$ and $Y_2$. The electric conduction coefficient of the plate along axis $Z_2$, normal to axes $X_2$ and $Y_2$, is equal to these along axes $X_2$ and $Y_2$, though it may as well be different therefrom.

The plate is made from a material which possesses as high electric conduction anisotropy as possible, namely with appreciably different electric conduction coefficients along axes $X_2$ and $Y_2$. The material in question has a thermoelectromotive force coefficient different from that of the material of the monocrystal 11. Used as the material for the plate is, in this case, monocrystalline graphite.

For purpose of clarity, shown in the left portion of FIG. 5 is the arrangement of axes $X_2$, $Y_2$ and $Z_2$ of the shorting member 12, the plate, while in the right portion of FIG. 5 there is shown the arrangement of axes $X_1$, $Y_1$ and $Z_1$ of the monocrystal 11, as well as the mutual arrangement of axes $X_2$, $Y_2$, $Z_2$ of the plate and axes $X_1$, $Y_1$, $Z_1$ of the monocrystal 11.

As can be seen from the drawing, axis $Z_1$ of the monocrystal 11 has the same direction as axis $Z_2$ of the shorting member 12, the plate. Axes $X_1$ and $Y_1$ of the monocrystal 11 lie in the same plane with axes $X_2$ and $Y_2$ of the plate, axis $Y_1$ forming an angle ($\phi$) of 45° with axis $Y_2$ and axis $X_1$ forming the same angle with axis $X_2$.

The shorting member 12 is placed on one of the lateral faces 13 of the monocrystal 11, which is parallel to the plane passing through axes $X_1$ and $Y_1$, and is equal in size therewith. Axes $X_2$ and $Y_2$ are parallel to the sides of the face 13 of the monocrystal 11, on which the plate is placed. The shorting member 12 and the monocrystal 11 are tightly pressed against each other by means of a clamping member (not shown), whereby electric contact is ensured between the plate and the monocrystal 11 along the entire interface. In this case, the plate electrically interconnects pairs of points M and N on the outer surface of the monocrystal 11 so that straight line MN between these points forms an angle $\phi$ of 45° with principal crystallographic axis $Y_1$ of the monocrystal 11, as was the case in the above-described embodiments shown in FIGS. 1 through 4.

Straight line MN is parallel to axis $Y_2$ of the shorting member 12, and the electric conduction coefficient along this axis is much higher than that along axis $X_2$ of the plate, therefore the electric connection between points M and N on the monocrystal 11 is characterized by a resistance which is much lower than that of the plate along axis $X_2$. Shown in FIG. 5 is only one pair of points M and N on the monocrystal 11, which points are electrically interconnected via the shorting member 12, the electric connection being characterized by a certain resistance. A plurality of other such pairs of points may be indicated on the monocrystal 11, for example points $M^1$ and $N^1$ on the outer surface of the monocrystal 11, or rather on the interface between the monocrystal 11 and the plate, the latter electrically interconnecting these points. Thus, the plate is, in this case, identical to each of a plurality of shorting members 10 (FIG. 4) made in the form of metal conductors.

The thermoelement also comprises leads 14 identical, in function and arrangement, to the leads 9 of FIG. 3.

The thermal flux traverses the thermoelement from one of its two faces 15 to the other in a direction indicated by arrow A.

The thermoelement of FIG. 1 operates as follows.

The generation of a voltage across the leads 4 of the thermoelement takes place in the following manner.

A thermal flux is made to traverse the thermoelement along arrow A parallel to the straight line interconnecting points M and N with the result that a thermoelectromotive force is developed in the monocrystal 1, which can be represented as a vector sum of two components, one being directed along the thermal flux and the other being normal thereto. The latter component is also normal to straight line MN and lies in the plane passing through axis $X_1$ and $Y_1$, i.e., it coincides with the straight line connecting the leads 4.

The thermoelectromotive force component directed along the thermal flux is due to the thermoelectric effect also well known as the Seebeck effect. The other component is due to the following. The thermoelectromotive force component directed along the thermal flux is shorted by the shorting member 3. This results in a current through the shorting member 3. The same amount of current also flows through the monocrystal 1 but in the opposite direction in parallel with the thermal flux along line MN at angle $\phi$ to principal crystallographic axis $Y_1$.

It is well known (cf. J. F. Nye, "Physical Properties of Crystals," Oxford, 1957) that if current flows through a monocrystal with anisotropic electric conductance at an angle to a principal crystallographic axis, an electric field is set up which is normal to the current through the monocrystal and lies in the plane passing through two principal crystallographic axes characterized by different electric conduction coefficients.

This is why a thermoelectromotive force component normal to the thermal flux is developed in a direction normal to the current through the monocrystal 1. This component is directed along the straight line connecting the leads 4. A voltage appears across the leads 4, which can be used when an external load is connected thereto. In this case, current may be tapped via the leads 4 to an external circuit. Thus, the thermoelement of the present invention can be used as an electric power source.

The operation of the thermoelement of FIG. 2 is similar to that of the thermoelement of FIG. 1.

However, the presence of a plurality of shorting members in the second embodiment provides for more effective shorting of the thermoelectromotive force component directed along the thermal flux. This brings about an increase in the initial current through the monocrystal $1^1$, hence a higher voltage across the leads 4.

The operation of the third and fourth embodiments of the present invention (FIGS. 3 and 4) is similar to that of the first and second embodiments (FIGS. 1 and 2), respectively.

The thermoelement of FIG. 5 is similar in operation to the above-described embodiments insofar as the orientation of the thermal flux therethrough and the physical nature of the thermoelectromotive force component normal to the normal flux are concerned. The shorting member 12 made in the form of a monocrystalline plate ensures more reliable shorting of the thermoelectromotive force component directed along the thermal flux, as compared to a plurality of shorting members made in the form of metal conductors. However, the shorting member 12 is to some extent electrically conducting along axis $X_2$, which causes slight shorting of the thermoelectromotive force component normal to the theral thermal and directed along axis $X_2$. To minimize the shorting of the latter component, the plate is crystallographically oriented in a manner shown above so that the electric conduction along axis $X_2$ is low and that along axis $Y_2$ is high.

The value of voltage $u$ produced by the thermoelement of FIG. 5 is determined from the following formula:

$$u = \frac{\Delta\alpha\Delta T}{2} \cdot \frac{a}{b} \cdot \frac{(k-k^{-1})}{k\sin^2\phi + k^{-1}\cos^2\phi + \frac{c_1}{c_2} \cdot \frac{\rho_{22}{}^p}{\rho_o}}$$

in which $\Delta T$ is the difference in temperature at points M and N; $\Delta\alpha$ is the difference in the thermoelectromotive force coefficients of the material of the monocrystal 11 and that of the shorting member 12 made in the form of a plate; $k = \sqrt{\rho_{11}/\rho_{22}}$; $\rho_o = \sqrt{\rho_{11}\rho_{22}}$; $\rho_{11}$ and $\rho_{22}$ stand for the resistivity of the material of the monocrystal 11 along crystallographic axes $X_1$ and $Y_1$, respectively; $\rho_{22}{}^p$ is the resistivity of the material of the shorting member 12 made in the form of a plate, along crystallographic axis $Y_2$; $a$, $b$, $c_1$ and $c_2$ stand for the geometric dimensions of the thermoelement.

The thermoelement of the present invention features high thermoelectric conversion efficiency and is capable of producing higher voltage as compared to the known anisotropic thermoelements. So, for example, when the monocrystal 11 is made from bismuth telluride and the shorting member 12, the plate, is made from monocrystalline graphite, the thermoelectric figure of merit of the proposed thermoelement reaches a value of $1.1 \cdot 10^{-3}$ grad$^{-1}$, while the thermoelectromotive force is $20 \cdot 10^{-3}$V with a temperature difference of 10°C.

What is claimed is:

1. A thermoelement comprising a monocrystal possessing different electric conduction coefficients along at least two principal crystallographic axes, wherein a thermoelectromotive force is developed under the effect of the thermal flux therethrough; at least one shorting member electrically connecting at least two points on said monocrystal, which lie opposite to each other on the outer surface thereof and in the plane passing through said two principal crystallographic axes, so that the straight line interconnecting these points forms an angle other than 0° and 90° with one of said principal crystallographic axes; said shorting member being designed to short the thermoelectromotive force component the direction whereof coincides with that of said thermal flux; leads to tap current from said monocrystal in a direction normal to said straight line interconnecting said two points on said monocrystal and in said plane passing through said two principal crystallographic axes.

2. A thermoelement as of claim 1, wherein said shorting member is made in the form of a metal conductor electrically coupled to said monocrystal only at said two points.

3. A thermoelement as of claim 1, comprising a plurality of said shorting members.

4. A thermoelement as of claim 3, wherein each shorting member is made in the form of a metal conductor coupled to said monocrystal only at said two points.

5. A thermoelement as of claim 1, wherein said monocrystal has the shape of a rectangular bar with one of its faces being parallel to said plane passing through said two principal crystallographic axes.

6. A thermoelement as of claim 5, wherein said shorting member is made in the form of a monocrystalline plate from a material whose thermoelectromotive force coefficient is different from that of the material of said monocrystal, and which possesses different electric conduction coefficients in at least two mutually perpendicular directions, the direction with the higher electric conduction coefficient coinciding with said line interconnecting said two points on said monocrystal.

7. A thermoelement as of claim 6, wherein said monocrystalline plate is in electric contact with said monocrystal over the entire surface of said face of said monocrystal.

* * * * *